(12) United States Patent
Fulghum et al.

(10) Patent No.: US 7,041,029 B2
(45) Date of Patent: May 9, 2006

(54) JOYSTICK CONTROLLED SCRUBBER

(75) Inventors: Trent A. Fulghum, Fayetteville, AR (US); Emert R. Whitaker, Siloam Springs, AR (US)

(73) Assignee: Alto U.S. Inc., Springdale, AR (US)

( * ) Notice: Subject to any disclaimer, the term of this patent is extended or adjusted under 35 U.S.C. 154(b) by 173 days.

(21) Appl. No.: 10/709,252

(22) Filed: Apr. 23, 2004

(65) Prior Publication Data
US 2005/0239594 A1 Oct. 27, 2005

(51) Int. Cl.
*B60W 10/04* (2006.01)
*B60W 10/20* (2006.01)

(52) U.S. Cl. .......................... 477/7; 477/903
(58) Field of Classification Search .............. 477/1, 477/7, 903; 15/340.4
See application file for complete search history.

(56) References Cited

U.S. PATENT DOCUMENTS

| | | | | |
|---|---|---|---|---|
| 3,942,215 | A | 3/1976 | Olds | 15/320 |
| 4,562,893 | A | 1/1986 | Cunard | 180/6.5 |
| 4,705,449 | A | 11/1987 | Christianson et al. | 414/685 |
| 5,842,532 | A | 12/1998 | Fox et al. | 180/6.48 |
| 5,923,096 | A * | 7/1999 | Manak | 307/10.1 |
| 6,199,647 | B1 | 3/2001 | Schaffner et al. | 180/65.1 |
| 6,371,228 | B1 * | 4/2002 | Husted et al. | 180/65.1 |
| 6,446,747 | B1 | 9/2002 | Muller et al. | 180/334 |
| 6,457,206 | B1 | 10/2002 | Judson | 15/320 |
| 6,580,246 | B1 | 6/2003 | Jacobs | 318/568.16 |
| 2002/0027039 | A1 * | 3/2002 | Kreuzer | 180/400 |
| 2002/0074181 | A1 | 6/2002 | Brandt et al. | 180/315 |
| 2003/0019682 | A1 * | 1/2003 | Schaedler et al. | 180/308 |
| 2004/0267411 | A1 * | 12/2004 | Mayer et al. | 701/1 |
| 2005/0256620 | A1 * | 11/2005 | Kato et al. | 701/41 |

* cited by examiner

*Primary Examiner*—Sherry Estremsky
(74) *Attorney, Agent, or Firm*—Blackwell Sanders Peper Martin LLP (57) ABSTRACT

An apparatus and method for a floor maintenance vehicle comprises a transaxle rear drive system and a powered front wheel steering system; and a joystick control system providing integrated control of the transaxle rear drive system and the powered steering system by controlling the traverse speed of the transaxle drive with respect to the steering angle such that the sharper the steering angle the lower the maximum traverse speed. A joystick control process for controlling a floor maintenance vehicle comprises receiving a turn signal to a steering control function from a joystick representing an operator desired turn angle, and outputting from the steering control function a turn angle signal; and receiving a speed signal to a traverse control function from a joystick representing an operator desired speed, and receiving the turn angle signal and outputting a transaxle speed control signal based on the speed signal and the turn angle signal.

10 Claims, 6 Drawing Sheets

JOYSTICK CONTROLLED SCRUBBER
>
> ## BACKGROUND OF INVENTION
>
> ### 1. Field of Invention
>
> This invention relates generally to floor maintenance machines and, more particularly, to steering control systems for floor maintenance vehicles.
>
> ### 2. Background Art
>
> There are various configurations of floor maintenance vehicles. Floor maintenance vehicles may perform a variety of floor maintenance functions including vacuuming, sweeping, waxing, buffing, stripping, scrubbing, soft-floor cleaning and sanding, including carpet cleaning. The floor maintenance vehicles utilized in the floor care industry are typically utilized to maintain flooring in large areas. Although these types of vehicles are utilized to maintain large floor areas, it remains essential that the vehicle is highly maneuverable to navigate in tight areas and around obstacles without skipping over portions of the floor. It is also important that the operator of the vehicle has a high level of visibility around the periphery of the vehicle for better navigation. Also, due to the large floor areas to be maintained, the vehicles undergo a lot of stress, therefore the vehicles must be reliable and easy to maintain. Also, due to the heavy usage, the vehicle must be easy to operate without causing undo stress or strain on the operator.
>
> Various vehicle designs have been utilized to address the above concerns. Some vehicles utilize a front motor drive wheel that is also utilized for steering the vehicle. It is commonly accepted in the industry that a front motor drive wheel that also provides steering provides greater maneuverability because sharp turns can be made. Also, the front motor drive wheel can begin to pull you in any direction it is directed. Many of the current floor maintenance vehicles that have front motor drive wheels, utilize two independent controls-one for steering and one for speed. Typically the two independent controls utilized are, a steering wheel and a foot pedal. The steering wheel is utilized for directing the front wheel by way of a direct linkage. The foot pedal is utilized as a variable control for speed.
>
> However, the vehicle designs as outlined above have disadvantages. For example, utilizing a steering wheel reduces forward visibility making it difficult for the operator to navigate the vehicle in certain areas. In addition, it is difficult to reduce the size of the steering wheel and associated steering column while maintaining adequate functionality. Also, the maintenance, assembly and repair for a steering wheel system can be costly. Many steering wheel systems incorporate an easy steer knob and solid steering linkage. However, such a system can deliver shock to the driver/operator in the event the wheel gets jammed or if the vehicle is in an accident. The operation of such a system can also cause undue fatigue and stress to the operator. Given this typical operation, steering wheel systems are not conducive for disabled individuals even with the easy steer knob.
>
> There is also a safety disadvantage with steering wheel systems. The two controls, a steering wheel for steering the front drive wheel and a pedal for variable speed control, can create an unsafe condition. With this two control system, an operator can turn the wheel to its maximum turning angle and then apply the maximum speed to the pedal. The condition can cause the vehicle to tip over or lose traction. There is also a performance disadvantage when utilizing a front wheel motor drive system because less traction is typically on the front wheel because the majority of the weight is typically placed in the rear of the machine, away from the driving force. A steering control system is needed to resolve the above problems. This system could require greater skill on the part of the operator and/or a longer training time.
>
> ## SUMMARY OF INVENTION
>
> One embodiment of the invention is a floor maintenance vehicle for performing floor maintenance operations, which comprises a transaxle rear drive system and a powered steering system for controlling the direction of a front wheel; and a joystick control system for providing integrated control of the transaxle rear drive system and the powered steering system by controlling the traverse speed of the transaxle drive with respect to the steering angle such that the sharper the steering angle the lower the maximum traverse speed.
>
> This embodiment of the invention incorporates a joystick control process for controlling a floor maintenance vehicle, which comprises the steps of receiving a turn signal to a steering control function from a joystick indicative of the joystick position representing an operator desired turn angle, and outputting from said steering control function a turn angle signal indicative of the operator desired turn angle; and a further step of receiving a speed signal to a traverse control function from a joystick indicative of the joystick position and an operator desired speed, and receiving from said traverse control function, communicably linked to said steering control function, the turn angle signal and outputting from said traverse control function a transaxle output control signal based on the speed signal and the turn angle signal.
>
> These and other advantageous features of the present invention will be in part apparent and in part pointed out herein below. The present invention provides a solution to many of the problems outlined above that are encountered with floor maintenance vehicles. It is an object of this invention to provide a steering control system that increases the operators visibility around the periphery of the vehicle. This is accomplished by replacing the typical steering wheel system with a joystick system. It is another object of the invention to integrate the benefits of transaxle drive system with a front wheel steering system, while maintaining safety, maneuverability, and traction. This is accomplished by the joystick control system. It is yet another object of the present invention to integrate and coordinate the speed range level with the steering angle as accomplished by the joystick control system.
>
> Using two integrated controllers, one for steering and one for traverse, the present invention utilizes a control system that is tied together via the joystick control system. The present invention specifically creates a relationship between traveling speed and turn angle by using two different controllers and a joystick control system that integrates the two. This system makes it impossible to travel at high speed and turn the wheel to its sharpest turning point, placing the machine in an unsafe condition.
>
> The present invention utilizes a transaxle for a drive system and a powered "steerable" system to control the front wheel for steering purposes. The present invention incorporates a transaxle because it improves traction over a front-mounted single motor drive wheel. Traditionally rear wheel drive units suffered in the area of maneuverability. However in the present design since the operator can only make the machine go very slowly at the maximum turn angle the operator can direct the machine to turn sharper thus improving the overall maneuverability. In the present design with the front wheel turned at maximum angle the operator can only supply a very small amount of forward speed thus allowing the front wheel to maintain traction and turn very sharply. The machine speed and turn angles are tied together in the present invention and prevents the operator from causing the unsafe conditions mentioned earlier.

The present invention combines things in a way that incorporates the best of all worlds. The present invention provides improved visibility, maneuverability, operator comfort, traction and control. The present invention provides an ideal system for a floor maintenance vehicle, particularly for a scrubber. Although it may be easier to do things like a mobility scooter or other similar device, however it would not drive as smoothly or feel as natural. Also by referencing machine speed the operator does not get false data or false feedback that could come from relying on the position of the joystick alone.

The present invention is easy and simple to drive and easy to train new operators. Maintenance and repair is facilitated. The present invention is more conducive for people with disabilities. The present invention incorporates all machine movement control into one device.

BRIEF DESCRIPTION OF DRAWINGS

For a better understanding of the present invention, reference may be made to the accompanying drawings in which.

DETAILED DESCRIPTION

Figure 1:
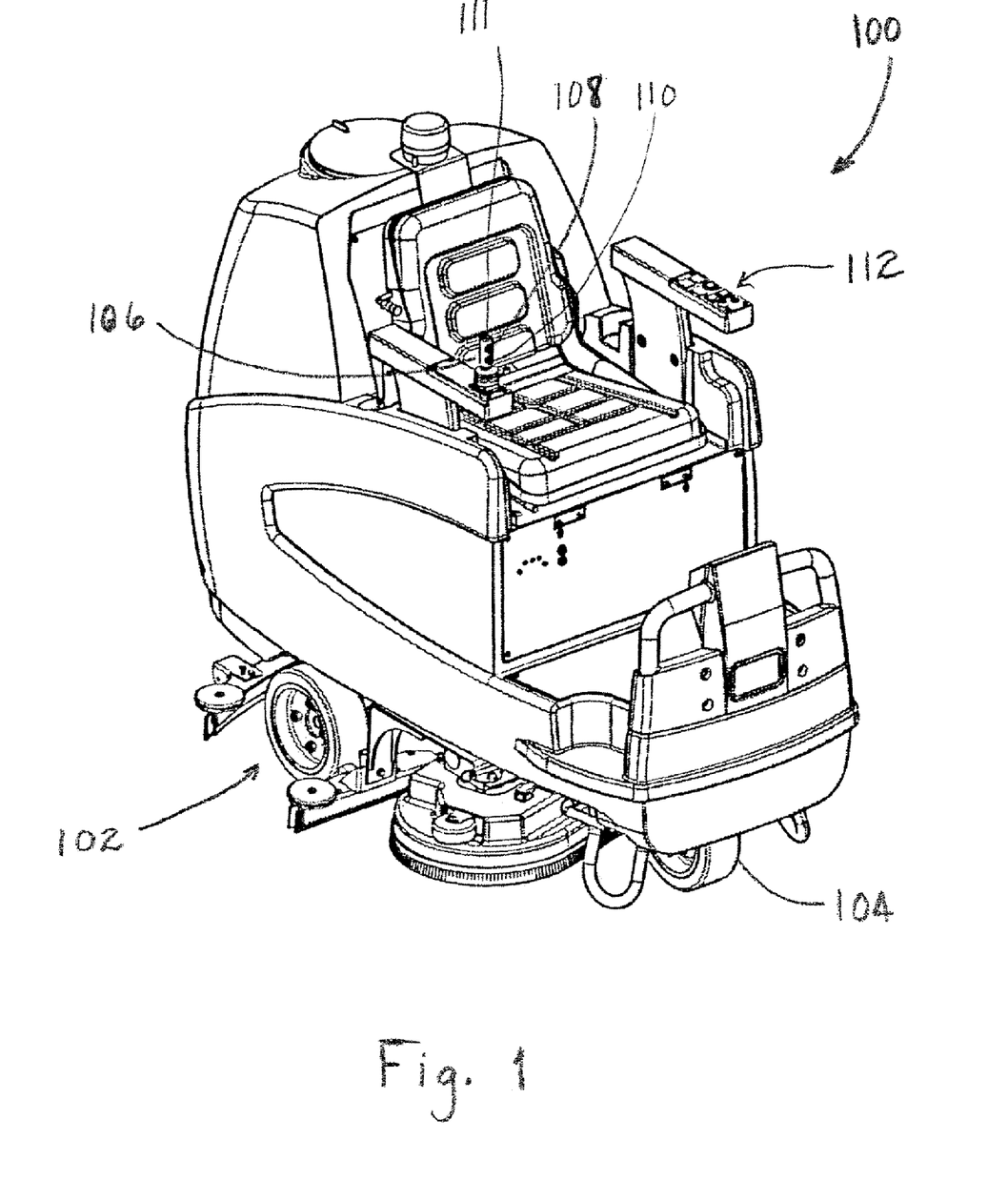
FIG. 1 is a front right side perspective view of the scrubber.
Figure 2:
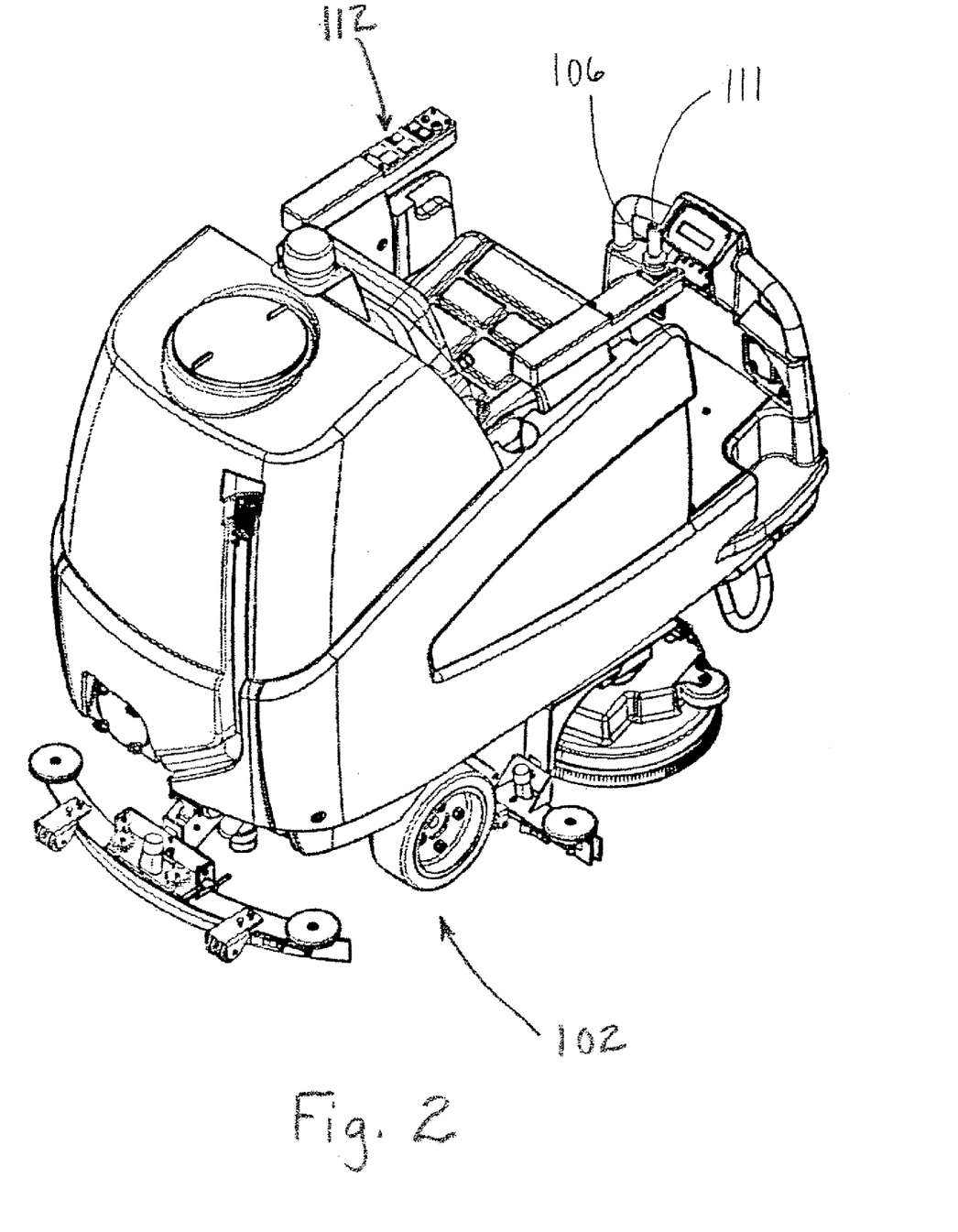
FIG. 2 is a rear right side perspective view of the scrubber.
Figure 3:
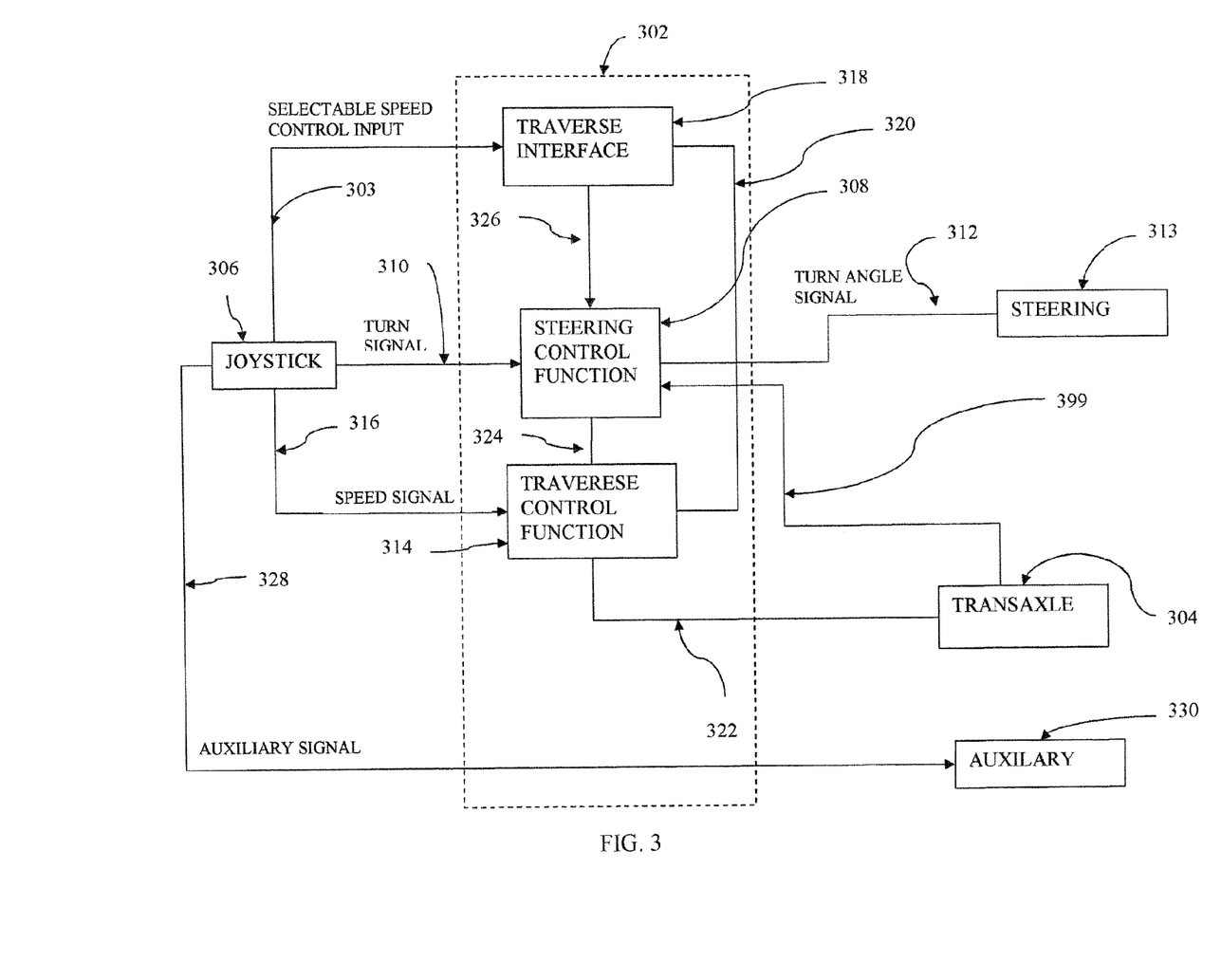
FIG. 3 is a functional block diagram of the joystick to steering system interface.

According to the embodiment(s) of the present invention, various views are illustrated in FIG. 1–3 and like reference numerals are being used consistently throughout to refer to like and corresponding parts of the invention for all of the various views and figures of the drawing. Also, please note that the first digit(s) of the reference number for a given item or part of the invention should correspond to the Fig. No. in which the item or part is first identified.

The details of the invention and various embodiments can be better understood by referring to the figures of the drawing. Referring to FIGS. 1 and 2, one embodiment of the present floor maintenance vehicle 100 invention comprising a transaxle rear drive system 102 and a powered steering system for controlling steering of a front wheel 104; and a joystick control system for providing integrated control of the transaxle rear drive system and the powered steering system by controlling the traverse output of the transaxle drive with respect to the steering angle such that the sharper the steering angle the lower the maximum traverse speed, teaches a novel apparatus and method for a floor maintenance vehicle for performing floor maintenance operations. The operator of the vehicle can navigate the vehicle with a joystick 106. One embodiment of the invention incorporates control buttons on the joystick. A one touch speed control button 110 can be integral with the joystick. Also, an auxiliary control button 111 can be integral with the joystick on top and can be utilized to activate a horn. A one touch start/stop button 108 can be used as a quick start and stop of the floor maintenance operation. One embodiment of the vehicle can incorporate an auxiliary control panel 112 for various functions.

Referring to FIG. 3 the joystick control system 302 has a selectable speed control input 303 for selectively varying the output of the transaxle rear drive system 304. The joystick control system receives the speed control input and varies the speed range level of the transaxle drive based on the speed range/level selected. For example, there can be three selectable range levels where each level has a speed range. For example, level one (1) could have speed range between 0–2 mph, level two (2) between 0–3, and level three (3) between 0–4 mph where you vary the speed of the vehicle in that range level by utilizing the joystick.

The selectable speed control input is selectable via a one touch control integral with the joystick 306. The selectable speed control input 303 can provide a plurality of selectable speed range levels each having a speed range, for example, first, second and third speed range levels as stated in the example above.

The joystick control system 302 includes a steering control function 308 operable to receive a turn signal 310 from a joystick 306 indicative of the joystick position and representing an operator desired turn angle. Various joystick devices are well known in the art, therefore further description of the joystick 306 is not required. The steering control function is further operable to output a turn angle signal 312 to the steering function 313 indicative of the operator desired turn angle. The control system further includes a traverse control function 314 operable to receive a speed signal 316 from a joystick indicative of the joystick position and an operator desired speed within the speed range level. The traverse control function 314 communicably linked 324 to the steering control function 308 to receive the turn angle signal. The traverse control function 314 is operable to receive the turn angle signal via the communication link 324 and is further operable to output a transaxle speed control signal integrally based on the speed range level 320, speed signal 316 and the turn angle signal received over communication link 324. The speed signal 316, speed range level and the turn angle signal can be analog or digital representation of the speed and turn angle. The traverse control function 314 is operable to receive and interpret the signals and further operable to output the appropriate transaxle drive signal 322. The interpretation of the signals and outputting the appropriate signal can be handled by a programmable logic control device or other type of controller within the traverse control function, steering control function and the traverse interface. The input and output signals of these functions can be analog or digital and the appropriate A/D converter and/or buffer devices and the appropriate logical control devices and/or processors can be contained within the functions. The relationship between steering angle and drive speed and how each is adjusted dynamically with respect to the other may vary based on the application, the size, weight of the floor maintenance equipment, the traction characteristics of the wheels and other relevant factors.

In one embodiment of the present invention the joystick control system 302 further includes a traverse interface function 318 operable to receive selectable speed level range control inputs for selectively varying the speed level range of the transaxle rear drive system 304 and further operable to output a selected speed range level control 320 to the traverse control function. The traverse control function is operable to receive the selected speed control output 320 and adjust the transaxle output range level of control signal 322 based on selected speed range level control output 320. The traverse interface 318 is also communicably linked 326 to the steering control 308 such that the selected speed range level control output 320 and/or the turn angle signal output 312 can be adjusted accordingly.

Each of the Traverse Interface 318 and the Steering Control Function 308 can include a programmable logic control device or other control device for interpreting input and providing the appropriate output based on the inputs.

The joystick control system 302 has selectable speed control input 303 for selectively varying the speed range level of the transaxle rear drive system 304 and the selectable speed control input can provide one of a plurality of selectable speed range levels via a one touch control integral with the joystick and the joystick also has an auxiliary output signal 328 for initiating an auxiliary action or function 330.

The present invention incorporates a joystick control process for controlling a floor maintenance vehicle comprising the steps of receiving a turn signal 310 to a steering control function 308 from a joystick 306 indicative of the joystick position representing an operator desired turn angle, and outputting from said steering control function a turn angle signal 312 indicative of the operator desired turn angle; and receiving a speed signal 316 to a traverse control function 314 from a joystick 306 indicative of the joystick position and an operator desired speed, and receiving from said traverse control function, communicably linked 324 to said steering control function, the turn angle signal and outputting from said traverse control function a transaxle speed control signal 322 based on the speed signal and the turn angle signal.

The control system can optionally include an optional one touch button for quick start and stop of a floor maintenance vehicle. The additional "one touch" button option allows for the quick and easy start and stop of the entire scrubbing operation using only one button 108, see FIG. 1. Using this operation will lower the brush deck, squeegee and start the vacuum motor. As soon as traverse forward or reverse is initiated the brushes and solution will start. You can stop all functions in the same manner by pressing the button again. The solution and brushes will stop and the brush head will raise and then a few seconds later the squeegee will raise and after a few more seconds the vacuum motor will shut off. This one touch feature can cut down on training time.

The novel aspect of this feature is the operator can program the brush head pressure and solution flow requirements and squeegee position so that every time the "one touch" is activated the machine will remember your settings. This can be done by placing the machine in the desired setup mode using switches on the control panel 112. After the machine is set the way the operator wants, you press and hold the "one touch" button until you get a signal (such as for example a beep) from the controller. This signal tells the operator that the unit has been programmed. These settings will remain even after the unit has been keyed off and back on. To reprogram you follow the original procedure and reset all functions. By adding this function you eliminate the need of having multiple individual controls and having to set them each and every time you start a floor maintenance procedure. Simply press the button and you have your custom setup machine just the way you need it. If the operator has gotten confused or has had other problems you can press and hold the button until a double signal is given and all the factory pre-sets will be recalled as the current "one touch" operation.

The joystick control process further comprising the steps of receiving a selectable speed control input to a traverse interface function for selectively varying the speed of the transaxle rear drive system by providing one of a plurality of selectable speed level signals and further outputting a selected speed control to the traverse control function, and receiving the selected speed control output to said traverse control function and adjusting the transaxle speed control signal based on selected speed control output.

The joystick control process further includes the step of receiving the selectable speed control input which can include receiving the selectable speed control inputs based on a selectable one touch control integral with the joystick and where the joystick has an auxiliary output signal for initiating an action or function.

Figure 6:
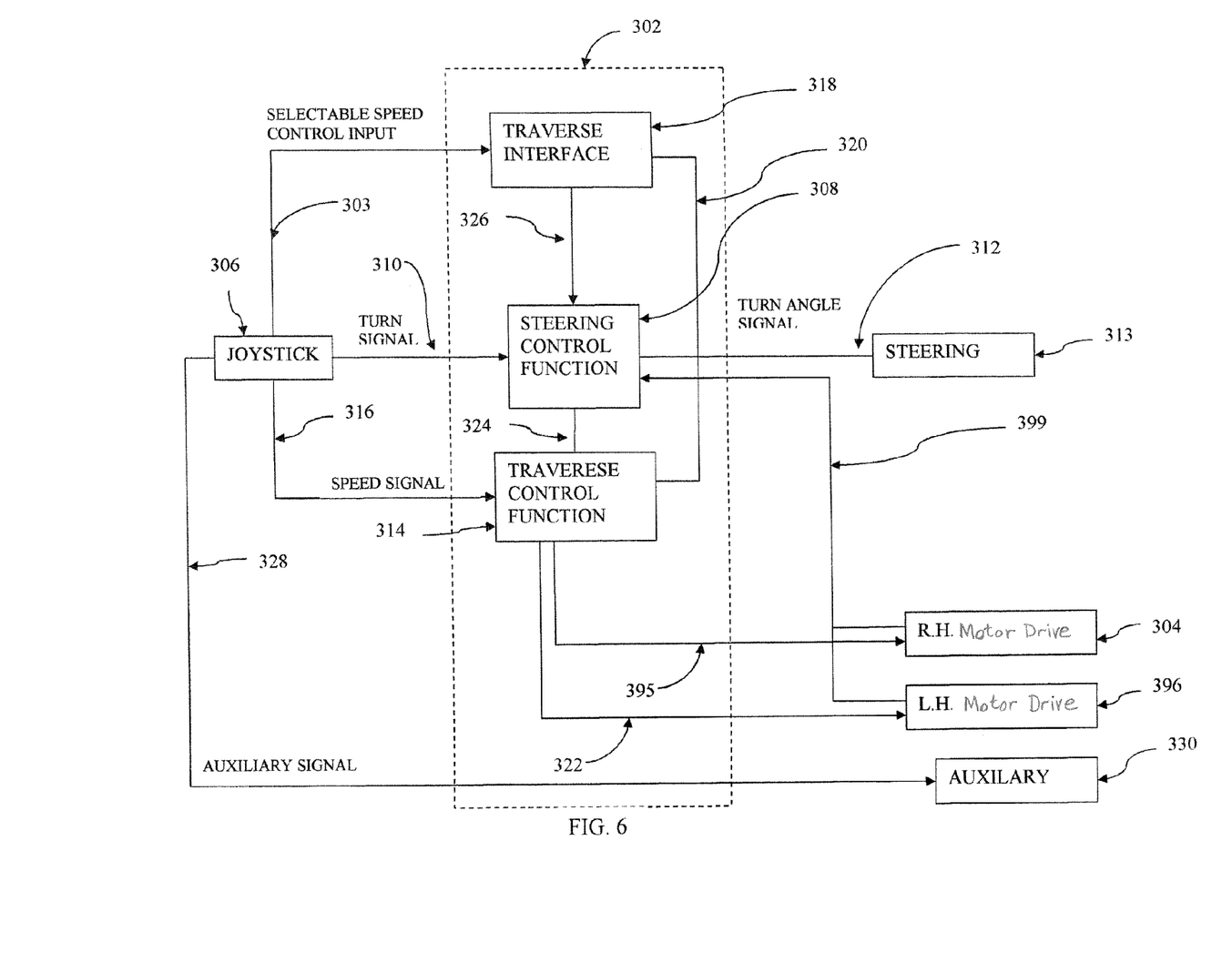
FIG. 6 is a functional block diagram showing a rear LH and RH motor drive.

Referring to FIG. 6, as an alternative embodiment the floor maintenance system can have independent left and right hand motor drives 396 and 304 for the left and right wheels respectively rather than having a single drive for both wheels. The Traverse control function 314 of the joystick control system 302 can provide separate right and left motor speed control signals, 322 and 395, based on the selected speed control output. The left and right motor drive functions can also provide left and right motor feedback signals 399. This embodiment of the joystick control system will have the same features as the above embodiment in that the transaxle speed control signal can be adjusted based on the steering angle and speed range level. However, with the embodiment shown in FIG. 6 the left and right motor drives can be adjusted independently based on the steering angle allowing for better handling and maneuverability. Also, the embodiment in FIG. 6 shows that the right and left motor drives can provide a feedback control signal 399 to the steering control function. Feedback voltage from the motor drive is monitored by the steering control to obtain traverse acceleration, deceleration, and speed signals from the traverse motor. These signals are then used to set the steering output (steering angle and turning speed) based on the steering control programmable mode parameters.

Figure 4:
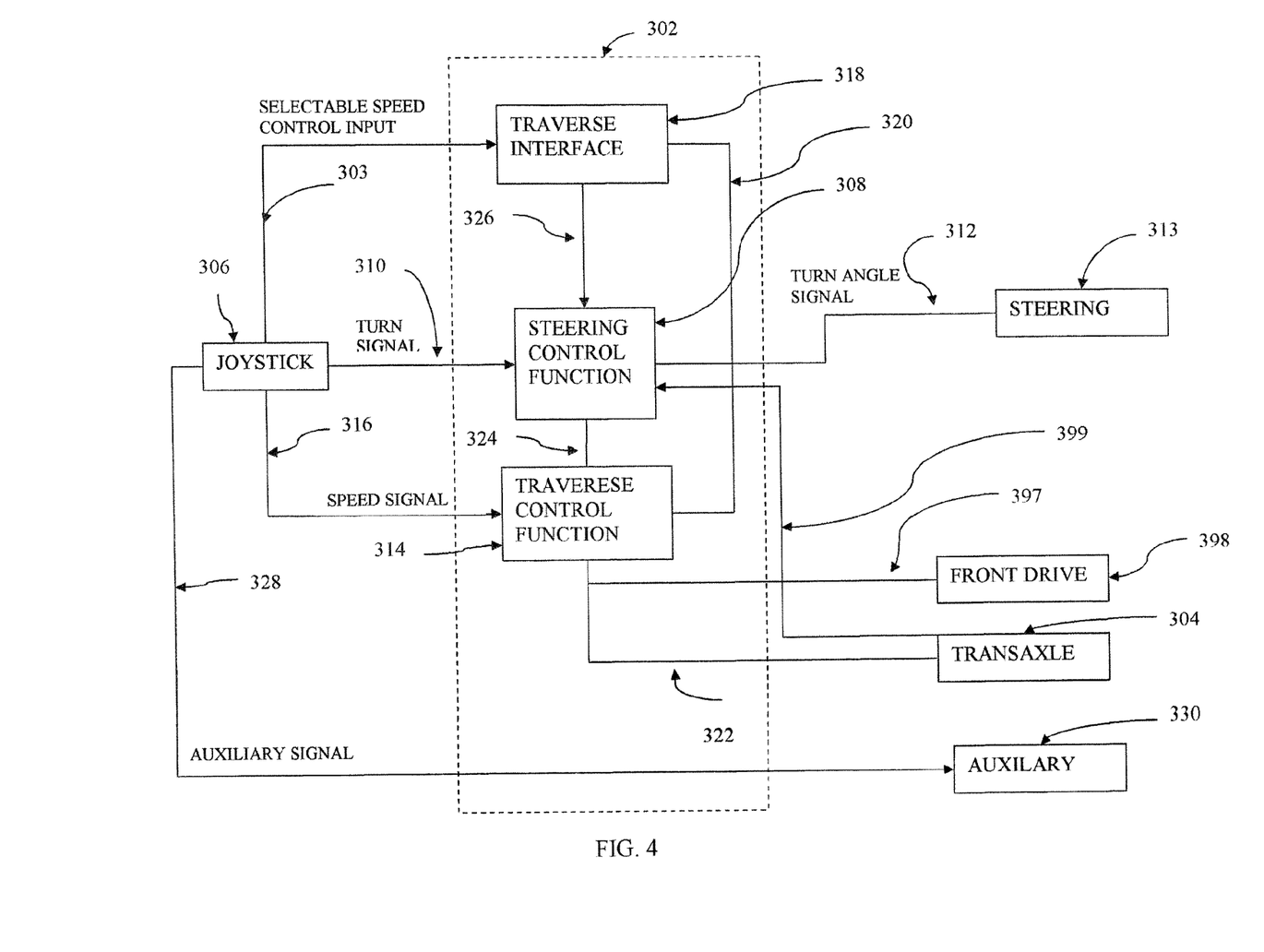
FIG. 4 is a functional block diagram showing a front drive and transaxle drive.

Referring to FIG. 4, as another alternative embodiment, the floor maintenance system can have independent front drive and a transaxle drive where again the steering angle and the transaxle drive are coordinated.

Figure 5:
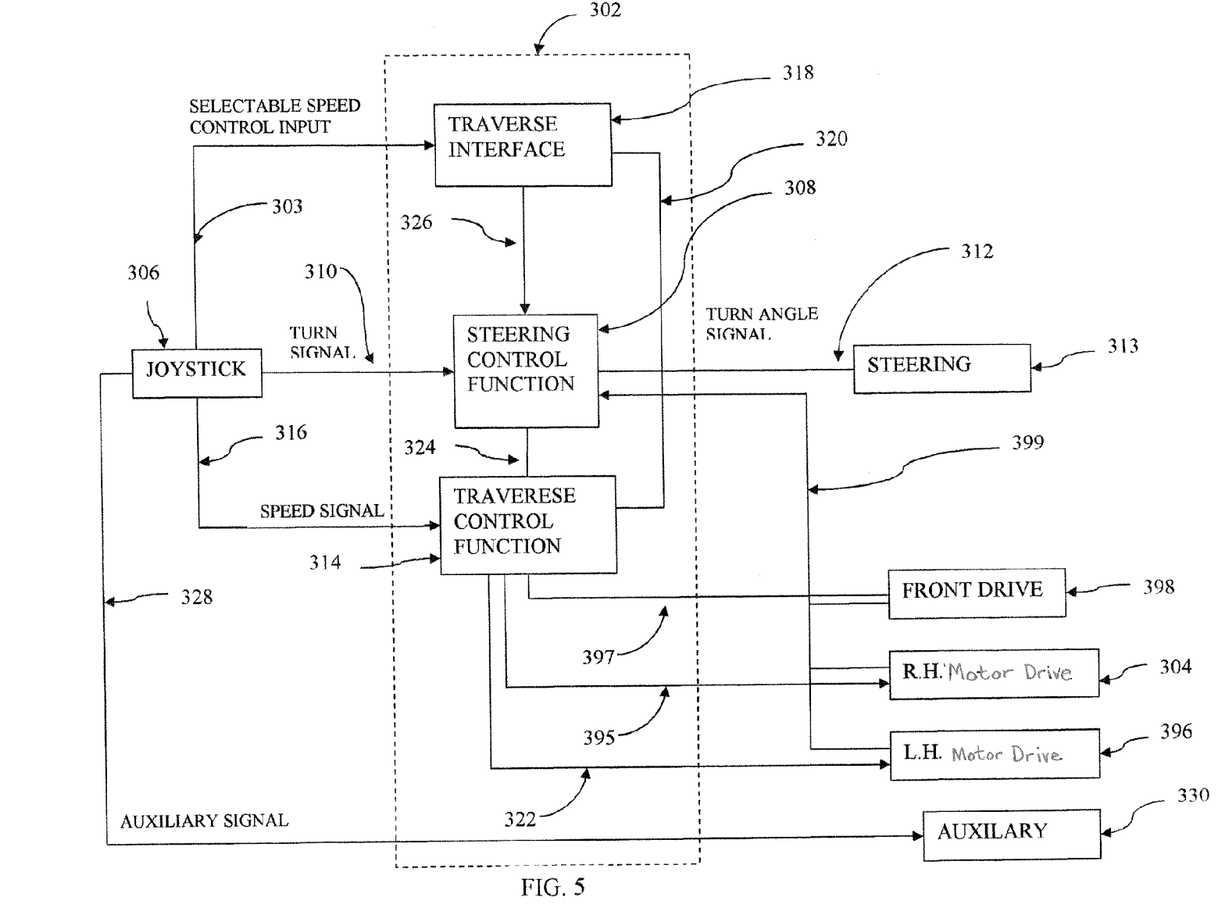
FIG. 5 is a functional block diagram showing a front drive and a rear LH and RH motor drive.

Referring to FIG. 5, as yet another alternative embodiment, the floor maintenance system can have independent left and right motor drives as shown in FIG. 6 and an independent front drive. This embodiment has the same feature of coordinating steering angle with drive, however, the embodiment in FIG. 5 reflects and all wheel drive system. Therefore, the drive for each of the three independently driven wheels can be adjusted base on the steering angle. In addition, the front drive as well as the left and right motor drives provide a feedback signal to the steering control function.

The various floor maintenance vehicle system examples shown above illustrate a novel joystick control system. A user of the present invention may choose any of the above joystick control system embodiments, or an equivalent thereof, depending upon the desired application. In this regard, it is recognized that various forms of the subject joystick control system invention could be utilized without departing from the spirit and scope of the present invention.

For example the joystick 106 could be interchanged sides with the control panel 112 such that the joystick is on the left hand side.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

The invention claimed is:

1. A floor maintenance vehicle for performing floor maintenance operations comprising:
   a transaxle rear drive system and a powered steering system for controlling steering of a front wheel; and
   a joystick control system for providing integrated control of the transaxle rear drive system and the powered steering system by controlling the traverse speed of the transaxle drive with respect to the steering angle such that the sharper the steering angle the lower the maximum traverse speed.

2. The floor maintenance vehicle as recited in claim 1, where the joystick control system has a selectable speed range level control input for selectively varying the speed range level of the transaxle rear drive system.

3. The floor maintenance vehicle as recited in claim 2, where the selectable speed range level control input is selectable via a one touch control integral with the joystick.

4. The floor maintenance vehicle as recited in claim 1, where the joystick control system includes:
   a steering control function operable to receive a turn signal from a joystick indicative of the joystick position representing an operator desired turn angle, said steering control function further operable to output a turn angle signal indicative of the operator desired turn angle; and
   a traverse control function operable to receive a speed signal from a joystick indicative of the joystick position and an operator desired speed, said traverse control function communicably linked to said steering control function to receive the turn angle signal and said traverse control function operable to output a transaxle speed control signal based on the speed signal and the turn angle signal.

5. The floor maintenance vehicle as recited in claim 4, where the joystick control system further includes:
   a traverse interface function operable to receive a plurality of selectable speed range level control inputs for selectively varying the speed range level of the transaxle rear drive system and further operable to output a selected speed control to the traverse control function, said traverse control function operable to receive the selected speed control output and adjust the transaxle speed control signal based on selected speed control output.

6. The floor maintenance vehicle as recited in claim 5, where the joystick control system has a selectable speed range level control input for selectively varying the speed range level of the transaxle rear drive system and the selectable speed range level control input is selectable via a one touch control integral with the joystick and where the joystick has an auxiliary output signal for initiating an action.

7. The floor maintenance vehicle as recited in claim 1, further comprising:
   a front wheel drive system; and
   where said joystick control system further provides integrated control of the front wheel drive system and the powered steering system by controlling the traverse speed of the front wheel drive with respect to the steering angle such that the sharper the steering angle the lower the maximum traverse speed.

8. A joystick control process for controlling a floor maintenance vehicle comprising the steps of:
   receiving a turn signal to a steering control function from a joystick indicative of the joystick position representing an operator desired turn angle, and outputting from said steering control function a turn angle signal indicative of the operator desired turn angle; and
   receiving a speed signal to a traverse control function from a joystick indicative of the joystick position and an operator desired speed, and receiving from said traverse control function communicably linked to said steering control function the turn angle signal and outputting from said traverse control function a transaxle speed control signal based on the speed signal and the turn angle signal.

9. The joystick control process as recited in claim 8, further comprising the steps of:
   receiving a selectable speed range level control input to a traverse interface function for selectively varying the speed range level of the transaxle rear drive system and further outputting a selected speed control to the traverse control function, and receiving the selected speed control output to said traverse control function and adjusting the transaxle speed control signal based on selected speed control output.

10. The joystick control process as recited in claim 9, where receiving the selectable speed range level control input is receiving the selectable speed control range level input based on a selectable one touch control integral with the joystick and where the joystick has an auxiliary output signal for initiating an action.

* * * * *